US007020455B2

(12) United States Patent
Krishnarajah et al.

(10) Patent No.: US 7,020,455 B2
(45) Date of Patent: Mar. 28, 2006

(54) SECURITY RECONFIGURATION IN A UNIVERSAL MOBILE TELECOMMUNICATIONS SYSTEM

(75) Inventors: Ainkaran Krishnarajah, Perth (AU); Hakan Palm, Lund (SE); Regina Johannesson, Lund (SE); Anders Berggren, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 413 days.

(21) Appl. No.: 10/259,435

(22) Filed: Sep. 30, 2002

(65) Prior Publication Data

US 2003/0100291 A1    May 29, 2003

Related U.S. Application Data

(60) Provisional application No. 60/333,485, filed on Nov. 28, 2001.

(51) Int. Cl.
 *H04M 1/66* (2006.01)
(52) U.S. Cl. ............... 455/410; 455/411; 455/452; 455/403; 455/422.1; 379/189; 379/161; 380/247; 380/250
(58) Field of Classification Search ............... 455/410, 455/411, 452.2, 432.1, 452, 403, 422.1; 713/171; 370/503, 329; 379/189, 161; 380/247, 250
See application file for complete search history.

(56) References Cited

U.S. PATENT DOCUMENTS

| 4,645,871 | A  | * | 2/1987  | Bremer et al. ............... 380/2 |
| 5,892,903 | A  | * | 4/1999  | Klaus ........................ 713/201 |
| 6,594,489 | B1 | * | 7/2003  | Holcman .................. 455/432.1 |
| 6,768,903 | B1 | * | 7/2004  | Fauconnier et al. ........ 455/403 |
| 6,829,358 | B1 | * | 12/2004 | Jiang ........................ 380/272 |
| 2001/0046240 | A1 | * | 11/2001 | Longoni et al. ............ 370/503 |
| 2002/0025820 | A1 | * | 2/2002  | Fauconnier et al. ........ 455/452 |
| 2002/0036992 | A1 | * | 3/2002  | Balachandran et al. ..... 370/329 |
| 2002/0066011 | A1 | * | 5/2002  | Vialen et al. ............... 713/150 |
| 2002/0184487 | A1 | * | 12/2002 | Badamo et al. ............. 713/153 |
| 2004/0039910 | A1 | * | 2/2004  | Isokangas et al. .......... 713/171 |

FOREIGN PATENT DOCUMENTS

| EP | 1 063 776 A2 | 12/2000 |
| EP | 1 063 806 A2 | 12/2000 |
| WO | WO 00/49760 | 8/2000 |
| WO | WO 01/29825 A1 | 4/2001 |
| WO | WO 01/37506 A1 | 5/2001 |

OTHER PUBLICATIONS

International Preliminary Report.

* cited by examiner

*Primary Examiner*—Sonny Trinh
*Assistant Examiner*—Khai Nguyen
(74) *Attorney, Agent, or Firm*—Nixon & Vanderhye P.C.

(57) ABSTRACT

The invention protects the security of a communication between a mobile radio and a radio access network (RAN). A connection is established through the RAN to support a communication with the mobile radio. The connection is configured with a first security configuration. One or more messages are sent over the connection using the first security configuration, each message having a message sequence number. When the connection needs to be configured to a second security configuration, an activation message sequence number associated with the reconfiguration is set. When the reconfiguration process is complete and the second security configuration is to be activated, the next message is sent over the connection with the activation message sequence number. Until that time and during the reconfiguration, when the mobile radio transmits a message with a message sequence number lower than the activation message sequence number to the RAN, it uses the first security configuration. An example of such a message is a cell update message or an area update message.

42 Claims, 7 Drawing Sheets

SECURITY RECONFIGURATION IN A UNIVERSAL MOBILE TELECOMMUNICATIONS SYSTEM

PRIORITY APPLICATION

This application claims priority from U.S. provisional patent application No. 60/333,485, filed on Nov. 28, 2001, the disclosure of which is incorporated herein by reference.

FIELD OF THE INVENTION

The present invention relates to Universal Mobile Telecommunications System (UMTS) communications, and more particularly, to security functions in a UMTS.

BACKGROUND AND SUMMARY OF THE INVENTION

An example communication system is the Universal Mobile Telecommunications System (UMTS) described in the 3GPP specification as well as other communications systems. A simplified, example architecture for a UMTS system is illustrated in FIG. 1 and includes a user equipment (UE) 12 which communicates over an air/radio interface $U_u$ with a radio access network (RAN) 14 sometimes referred to as a UMTS Terrestrial Radio Access Network (UTRAN). The RAN 14 communicates with one or more core networks 16. In FIG. 1, a circuit-switched core network 18 and a packet-switched core network 20 both communicate with the RAN 14 over respective $I_u$-PS interfaces.

A more detailed illustration of a UTRAN 22 is shown in FIG. 2. The UTRAN 22 includes one or more radio network systems (RNS) 24. Each RNS 24 includes one or more radio network controllers (RNC) 26. RNCs communicate over an $I_{ur}$ interface. Each RNC is coupled to one or more base stations, each of which is referred to in the UTRAN as a node B 28. The RNC and each node B communicate over an interface $I_{ub}$. Each node B conducts radio communications via one or more cells with various UEs. In FIG. 2, each node B 28 is shown with three cells C1–C3.

FIG. 3 shows the UTRAN radio protocol architecture with more detailed information regarding the same available in the 3GPP TS25.301 (the disclosure of which is incorporated herein by reference). The protocol architecture is divided into five layers including an application layer, a transport layer, a radio resource control (RRC) layer, a link layer, and a physical layer. The left side of the protocol stack from the RRC layer and below represents the control plane where control signaling is conducted. The right side of the protocol stack represents the user plane where user traffic is communicated. Information is communicated through the UTRAN using logical channels referred to as radio bearers. On the control plane, the radio bearers are called signal radio bearers and may include, for example, signaling radio bearers 0–4. In the user plane, other radio bearers such as radio bearers 5–31 are used to carry user traffic. These bearers are then transported on physical transport channels over the physical layer/radio interface. More details regarding the radio access bearer service provided by the UTRAN may be found in 3GPP TS 23.107 (the disclosure of which is incorporated herein by reference).

While details are provided regarding the UTRAN, other radio access networks exist. One example is the GSM/EDGE radio access network (GERAN) that evolved from GSM to the enhanced data rates for GSM evolution (EDGE). Although the present invention is particularly applicable to the UTRAN, it may be applied in any RAN.

Security functions in a communication system provide some sort of confidentiality and/or authentication for a communication. In UMTS, an example confidentiality security function is ciphering or encryption of user data, and an example authentication security function is integrity protection of control signaling. Control signaling sent between a UE/mobile radio station and the radio network is considered sensitive information whose integrity must be protected. In regard to control signaling integrity protection, reference is made to the 3GPP specification TS 33.102 (the disclosure of which is incorporated herein by reference), and in particular, to section 6.5 that relates to access link integrity.

Ciphering/encrypting may be performed for user traffic. Ciphering is performed in the user plane either at the radio link control (RLC) sublayer of the link layer, i.e., if the RLC mode is acknowledged or unacknowledged, or in the media access control (MAC) sublayer, i.e., if the mode is RLC transparent mode. Integrity protection/authentication of control signaling is performed in the control plane at the RRC layer. When a connection (which can be viewed as a sort of logical channel) is to be established with a user equipment through the UTRAN, a security mode setup procedure is performed to protect the integrity of control signaling messages sent between the UE and the UTRAN. Examples of control signaling messages include paging messages, handover messages, RRC connection request, setup, and release messages, system broadcast information messages, etc.

Different algorithms may be used to cipher/encrypt user data and to protect the integrity of control signaling. A ciphering algorithm may generate a ciphering key (CK). One example of such a ciphering algorithm is an "f8" algorithm described in 3GPP TS 33.102. Similarly, an integrity/authentication protection algorithm may generate an integrity protection key (IK). One example of such an integrity protection algorithm is an "f9" algorithm described in 3GPP TS 33.102. The pair of "keys" generated by ciphering and integrity protection algorithms is sometimes referred to as a "key set." Recall from FIG. 1 that the UTRAN may be coupled to different core networks such as a circuit-switched network and a packet-switched network. A key pair for a circuit-switched domain may be denoted, $(CK_{cs}, IK_{cs})$, and for the packet-switched domain, $(CK_{ps}, IK_{ps})$.

When a UE initiates a session (e.g., a multimedia session), a Radio Resource Control (RRC) layer 3 connection is established within the UTRAN. Part of that connection setup includes an authentication procedure where a security configuration is established for a specific core network domain. The security configuration for a core network domain may be broken down into two parts. A first part of the security configuration is from the core network to the UTRAN using an RANAP Security Mode Command message, (see 3GPP TS 25.413, the disclosure of which is incorporated herein by reference). A second part is from the UTRAN to the UE using an RRC Security Mode Command (see 3GPP TS 25.331, the disclosure of which is incorporated herein by reference).

An example procedure for establishing a security configuration between the UTRAN and UE is illustrated in FIG. 4. Initially, the mobile station/user equipment establishes an RRC connection with a serving-RNC (SRNC) in the UTRAN. This connection is initiated for a particular core network domain. For example, the connection might support a web browser application running on the UE, and therefore, the connection would be a packet-switched core network.

During the RRC connection establishment, parameter values necessary to establish an initial security configuration for the connection are transferred between the UE and the SRNC along with the UE's security capabilities. The SRNC stores the security configuration values and the UE security capabilities.

The UE sends an initial protocol layer 3 (L3) message including its user identity, (e.g., IMSI), to initiate a connection set-up using a visiting location register (VLR) for a circuit-switched connection or a serving GPRS support node (SGSN) for a packet-switched domain-type connection. Authentication and key generation procedures are performed between the VLR/SGSN and the UE where an integrity and ciphering key pair is generated for the connection and stored by the UE. The VLR/SGSN also decides which integrity and ciphering algorithms may be employed: UIA stands for UMTS integrity algorithm and UEA stands for UMTS encryption algorithm. The VLR/SGSN sends a Security Mode Command to the SRNC to provide the allowed integrity and encryption algorithms (UIAs and UEAs) as well as the integrity key (IK) and ciphering key (CK).

The SRNC selects an appropriate integrity algorithm and encryption algorithm and generates parameters needed for the selected algorithms. An example of such a parameter is a random value generated at the network (referred to as FRESH in the 3GPP spec). The SRNC sends a Security Mode Command to the UE which includes the core network domain, the selected integrity algorithm, and parameters like the random value. The selected integrity algorithm output/result is also sent. That output/result is denoted MAC-I, for Message Authorization Code-Integrity, and is generated as a function of the integrity key (IK), the message whose integrity is to be protected, the random number, a direction of signaling (i.e., uplink or downlink), and a count value corresponding to a message sequence number (MSN) of the current RRC message. The UE verifies this information including generating for itself the MAC-I using the same parameters, and acknowledges that the security mode is complete in messages 9, 10, and 11. Thereafter, ciphering and deciphering as well as authentication of messages for this connection are performed using the configured security parameters.

The current message sequence number (MSN) for integrity protection is referred to in the 3GPP specification as count-I. For each signaling radio bearers 0–4, there is one count-I value per uplink signaling radio bearer and one count-I per downlink signaling radio bearer. Count-I is composed of two parts. A short sequence number forming the least significant bits of the count is a four bit RRC sequence number (RRC SN) and is available in each RRC packet data unit (PDU). The long sequence number is an RRC hyper-frame number (RRC HFN) which is incremented each RRC sequence number cycle. The RRC HFN is initialized in message 1 (START values) as one of the security configuration parameter values.

Accordingly, the signaling radio bearers used to transfer signaling messages from core network service domains are integrity protected by the integrity key of the core network service domain for which the most recent security mode negotiation took place. If additional services are requested, if services are requested from another core network, from the same core network, or if an additional connection is requested, it may be necessary to change the integrity configuration of an already integrity protected, ongoing signaling connection.

An example of such security reconfiguration over the air interface is an RRC security mode control procedure described in 3GPP TS 25.331, section 8.1.12, and illustrated in FIG. 5. The purpose of this procedure is to start/restart ciphering with a new ciphering configuration for data traffic radio bearers, and to start or modify the integrity protection configuration for all control signaling radio bearers. To start or modify the integrity protection configuration, the UTRAN sends a Security Mode Command to the UE. Upon reception of the Security Mode Command, the UE sets an activation value in the uplink direction, and an activation value by the UTRAN is set in the downlink direction for all signaling radio bearers. An activation value is specified for each affected radio bearer. This activation value effectively indicates when the new security/integrity configuration with new integrity and ciphering keys should be used.

In one approach, the UE may set the uplink activation value for a corresponding radio access bearer as the current RRC message sequence number (RRC $SN_{current}$) plus a constant k. Recall that the RRC message sequence number is the four bit value used to stamp each RRC message with a number. The constant, for example, might be determined based on a maximum number of retransmissions of a Cell Update or a routing area Update message transmitted by the UE to the UTRAN. Any such update message is sent in the uplink direction by the UE to the UTRAN on a signaling radio bearer, e.g., RB0. This setting of the activation value until some message is transmitted in the future means that the UE will send update messages using the old security configuration, including the old ciphering and integrity keys starting from the current sequence number message (RRC $SN_{current}$). The old configuration is used until a future message is transmitted having the activation message sequence number (RRC $SN_{current}+k$). Only when the message sequence number reaches (RRC $SN_{current}+k$) will the new security configuration be applied. By setting the activation number to some future message sequence number, the UE can send cell updates and other messages to the UTRAN using the old security configuration even though security reconfiguration is taking place. Cell update messages are particularly important, especially for a fast-moving user equipment, to ensure that the current location of the mobile is known by the UTRAN.

Thus, the benefit of this security configuration procedure is that the cell update and other important messages can be sent with the old security configuration so that the UTRAN can receive such messages while the security reconfiguration process transpires. Unfortunately, a disadvantage with this approach is that the mechanism for indicating use of the new security configuration is flawed.

The problem is the UE needs to send a certain number of CELL UPDATE messages before the new security configuration will be used and the old security configuration will be released. In the example above that time is when the current message received at the UTRAN from the UE has a message sequence number equal to RRC $SN_{current}+k$. This approach assumes that the UE is moving between enough cells so that k CELL UPDATEs will occur in a relatively short period of time. For a non-moving or slow-moving UE, it is likely that such an activation number of cell update messages will not be sent in a reasonable period of time (if ever). As a result, the new security configuration, e.g., for a new UE to core network connection, will not be implemented and the requested new service or connection will not be delivered.

The present invention provides a solution to the problem identified above in an improved method for protecting the security of a communication between a mobile radio and a radio access network (RAN). A connection is established through the RAN to support a communication with the mobile radio. The connection is configured with a first security configuration. One or more messages is sent over the connection using the first security connection, each message having a message sequence number. When it is determined that there is a need to configure the connection to a second security configuration, an activation message sequence number associated with the reconfiguration is set. When the reconfiguration process is complete and the second security configuration is to be activated, the next message is sent over the connection with the activation message sequence number. Until that time and during the reconfiguration, when the mobile radio transmits a message with a message sequence number lower than the activation message sequence number to the RAN, it uses the first security configuration. An example of such a message is a cell update message or an area update message.

The first security configuration corresponds, for example, to a first connection associated with the session involving the mobile radio, and the second security configuration may correspond, for example, to a second connection associated with the session. In a multimedia session, the first connection could relate to one type of media, and the second connection to another type.

The security configuration may relate to integrity protection of a message, where the message includes control signaling related to the connection. The first security configuration may include a first integrity protection key used to authenticate the control signaling. The second security configuration includes a second integrity protection key. The security configuration may also relate to confidentiality protection of the connection. For example, the first security configuration includes a first encryption key used to encrypt data traffic associated with the connection, and the second security configuration includes a second encryption key used to encrypt the data traffic.

The activation message sequence number corresponds to a future message sequence number that is greater than the next message number in the message sequence. In one example, non-limiting embodiment, the activation message sequence number is set using the maximum number of retransmissions of a message. The activation message sequence number is sent with the next message upon completion of the reconfiguration operation, even when the activation number of messages has not yet been transmitted at the time the security reconfiguration is complete. In this way, unnecessary or indefinite delays associated with the security reconfiguration are avoided.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, while the present invention is described in an example application to UMTS systems, the present invention may be employed in any cellular radio system.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 6:
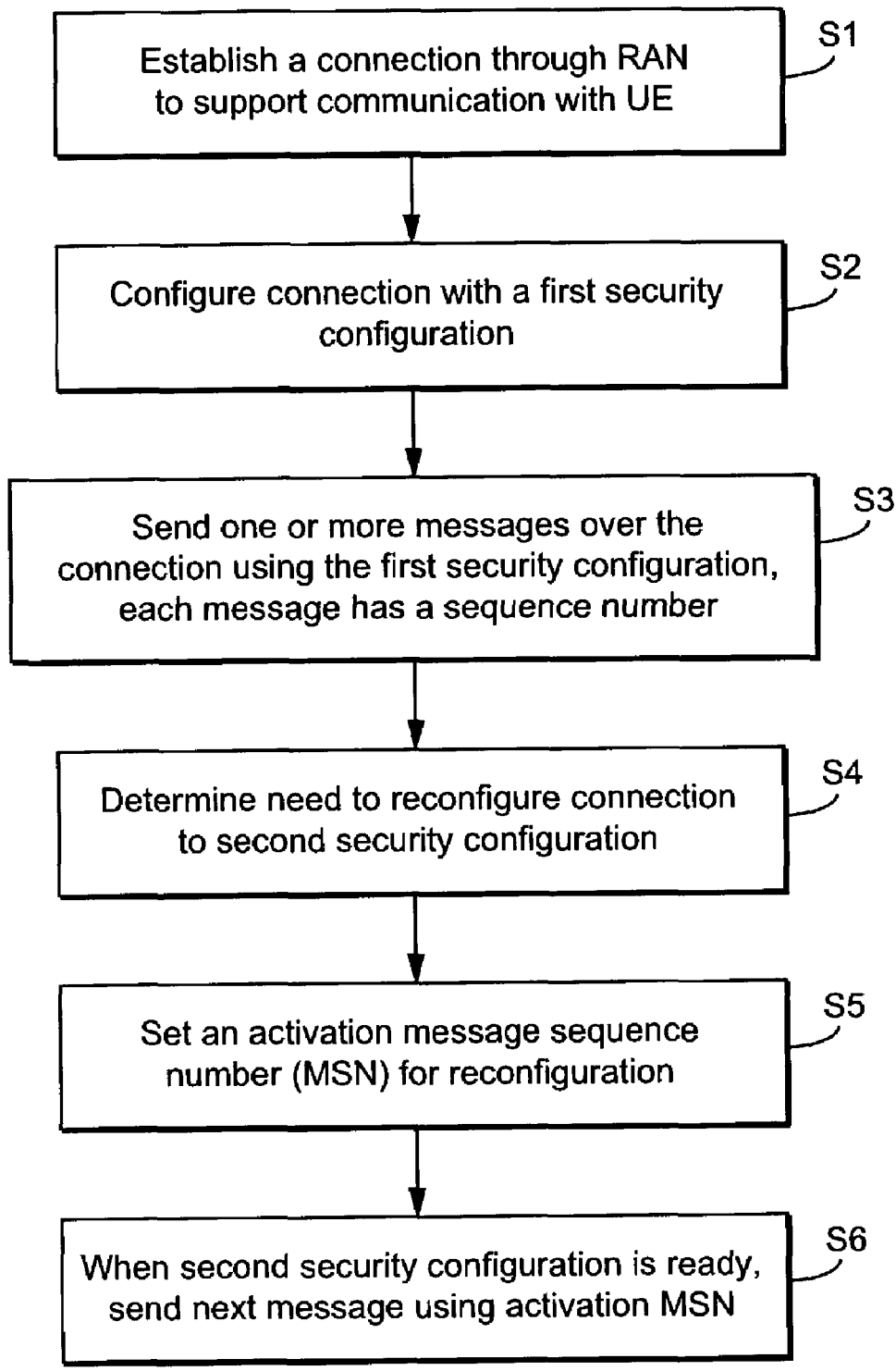
FIG. 6 illustrates example procedures in flowchart form for implementing an example embodiment of the present invention.

The present invention may be implemented in any radio communications system that includes a radio access network. In this regard, reference is now made to the flowchart diagram illustrated in FIG. 6 which shows one set of non-limiting, example procedures for implementing the present invention. Initially, a connection is established through the radio access network to support a communication with a user equipment (step S1). The connection is configured using a first security configuration (step S2). One or more messages is sent over the connection using the first security configuration. Each message has its own message sequence number (MSN), i.e., MSN=1, 2, 3, . . . (step S3). It is determined that there is a need to reconfigure the connection (or an additional connection for a multimedia session involving the user equipment) to a second security configuration (step S4). An activation message sequence number is set for purposes of the security reconfiguration (step S5). When the second security configuration is ready to be applied, a next message is sent using the activation message sequence number (step S6).

In other words, whenever the second security configuration is ready for activation, the normal in-sequence message number is not used for the next message. Instead, the activation message sequence number is used to indicate that the UE and the RAN should now send messages using the second security configuration. Up until the sending of that message that includes the activation message sequence number, messages are sent between the UE and the RAN using the first security configuration. In this way, important messages, such as cell update messages or area update messages can be sent, for example, from the UE to the RAN to update the UE's position during the time that the security reconfiguration process is occurring. On the other hand, the present invention avoids undue delays in activating the second security configuration by sending the activation message sequence number with the next message sent after the reconfiguration process is complete.

Figure 1:
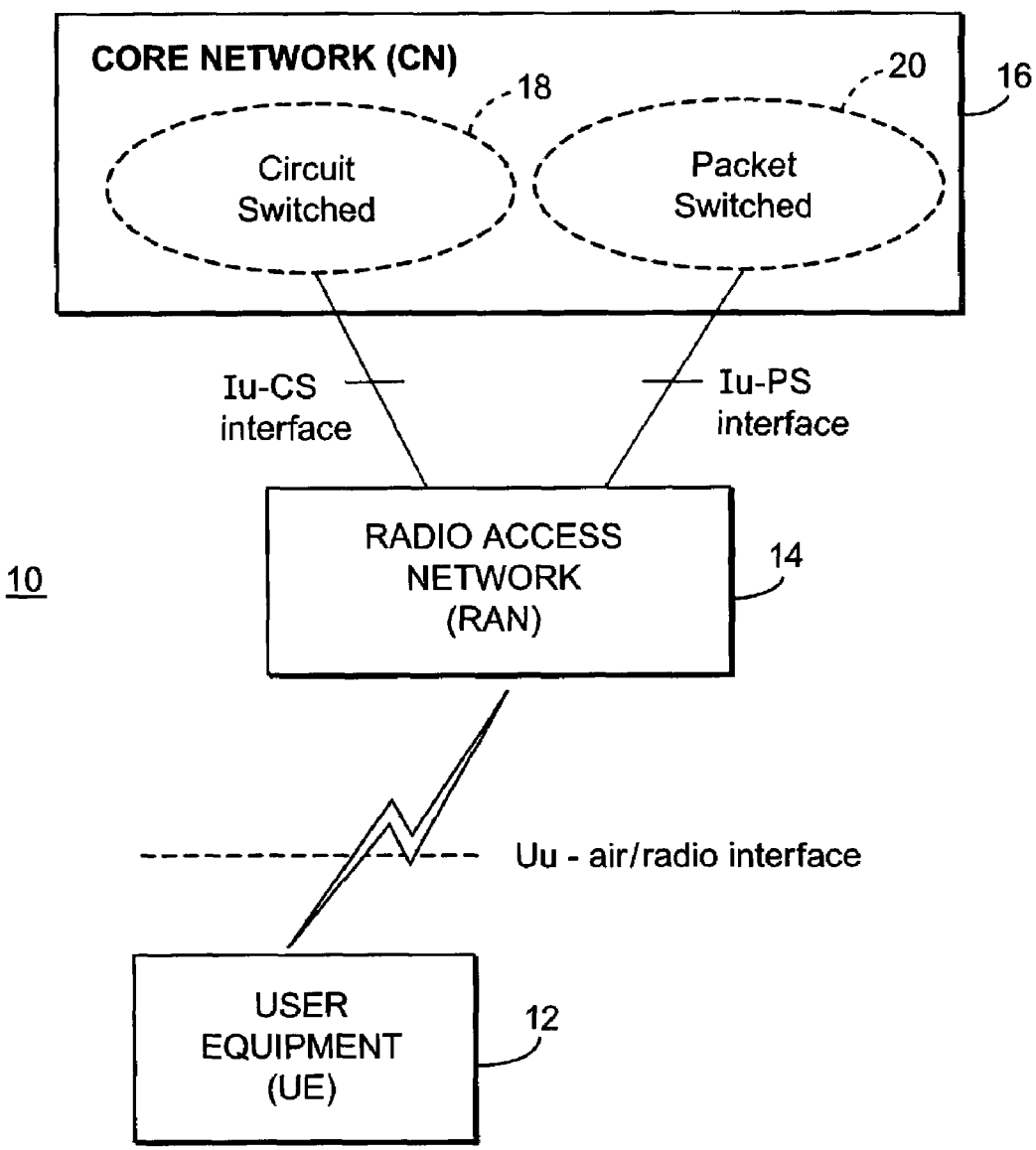
FIG. 1 illustrates a simplified block diagram of an example UMTS communications system in which the present invention may be employed.
Figure 2:
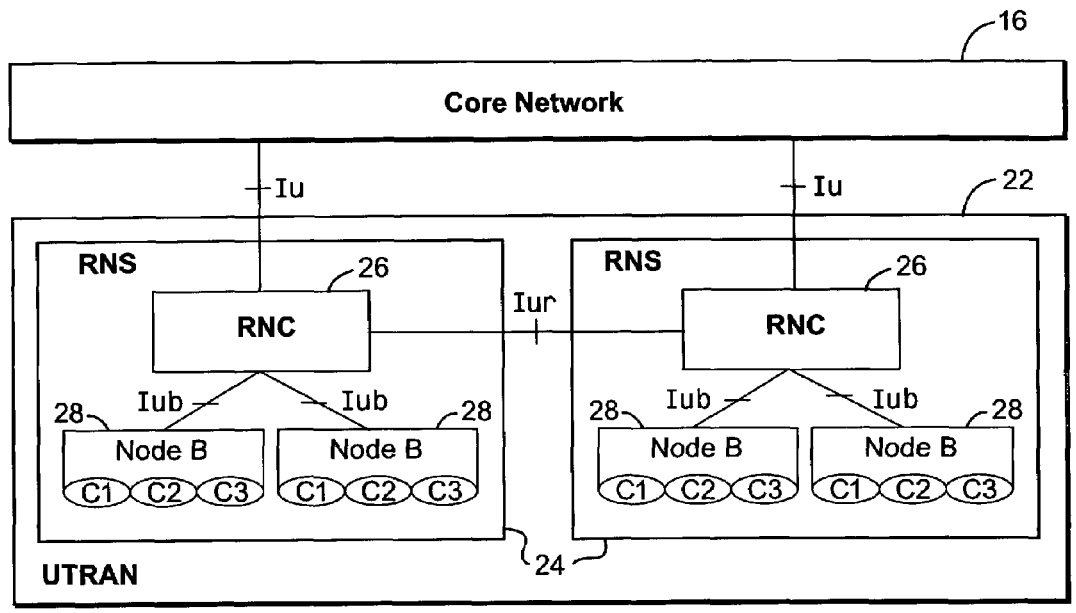
FIG. 2 illustrates additional details of a UTRAN-type of radio access network.
Figure 5:
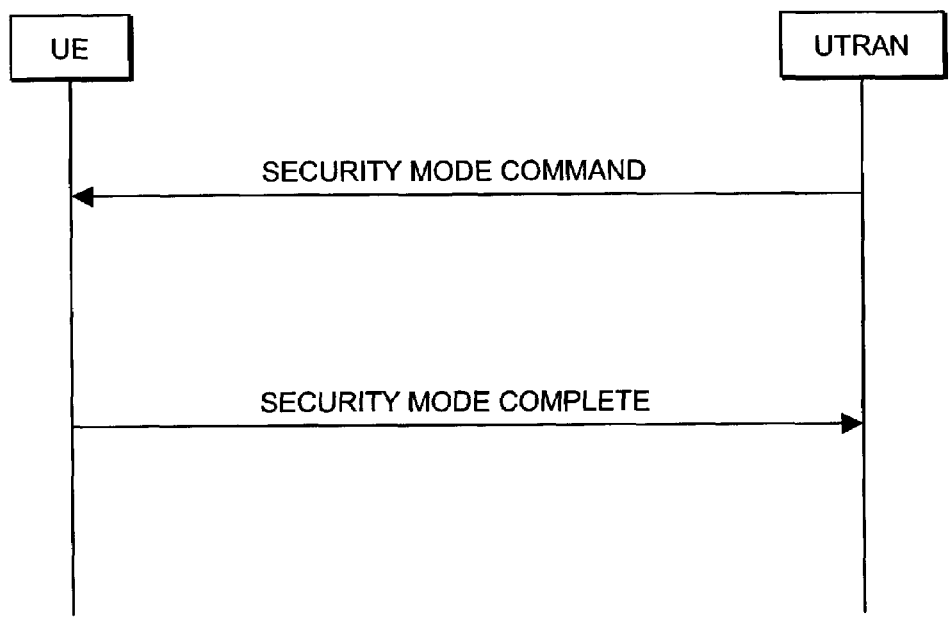
FIG. 5 illustrates a security reconfiguration signaling diagram.
Figure 3:
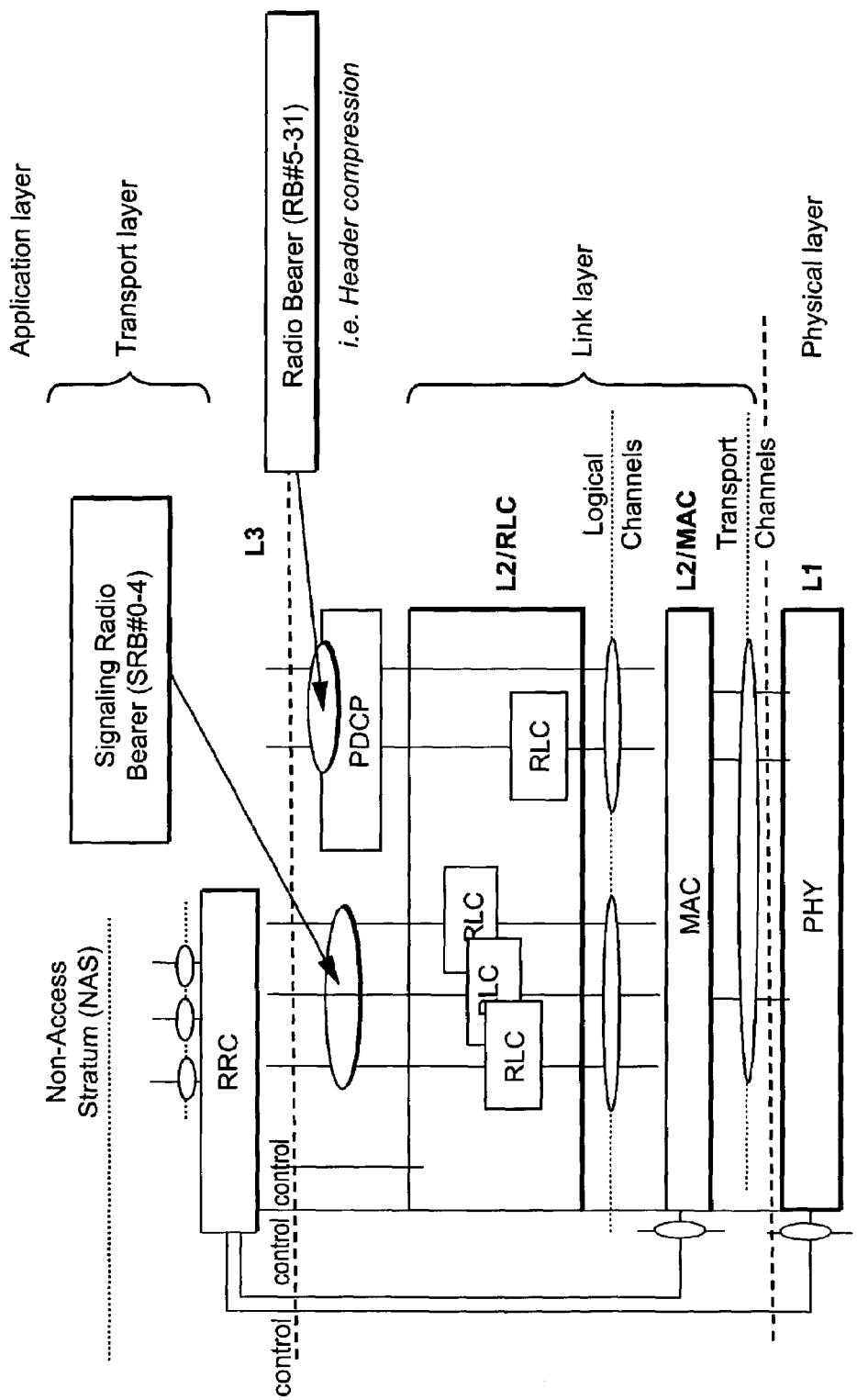
FIG. 3 illustrates various protocols used in the UTRAN for setting up a connection with a mobile radio.
Figure 4:
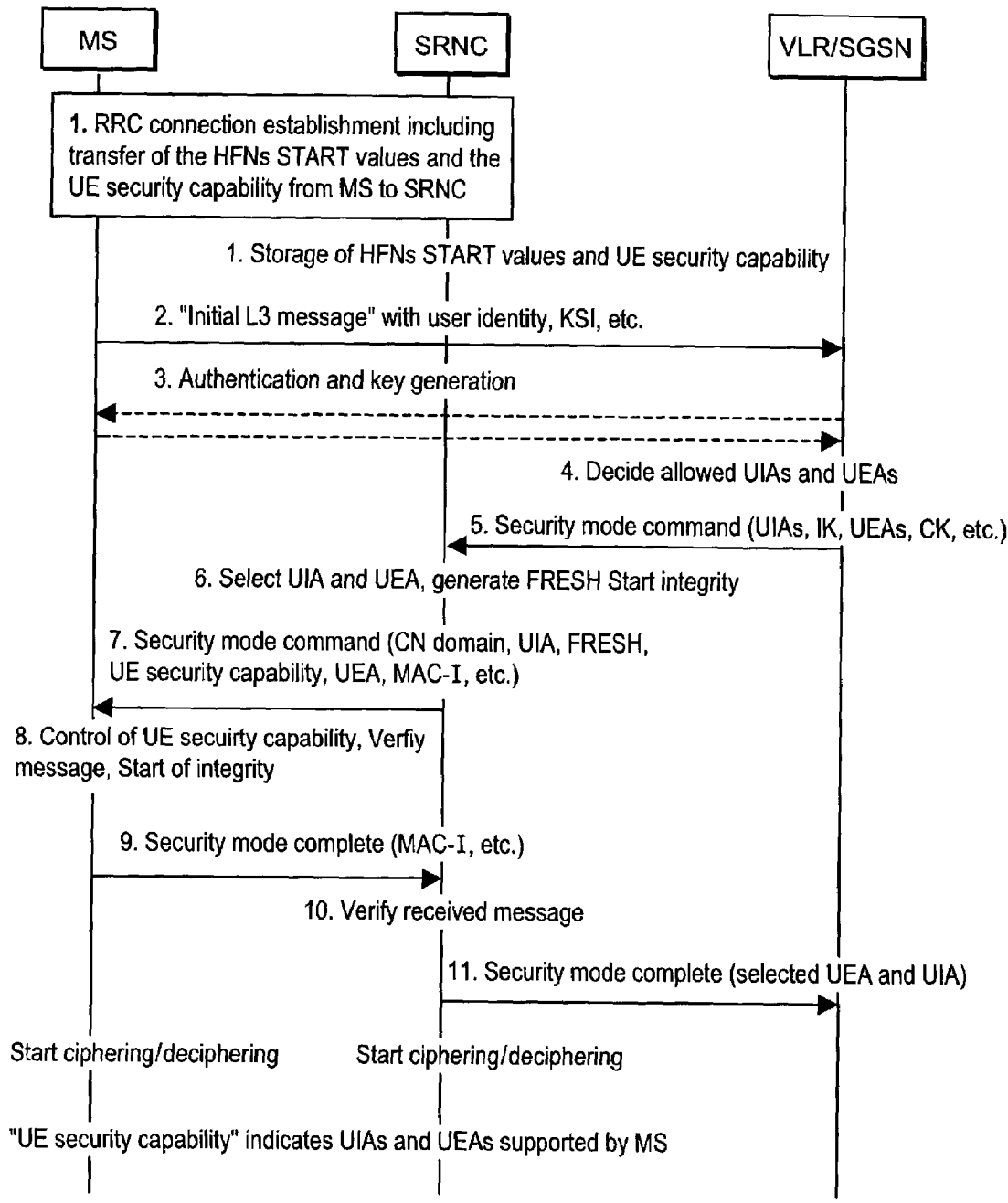
FIG. 4 illustrates an authentication and connection set-up signaling diagram.
Figure 7A:
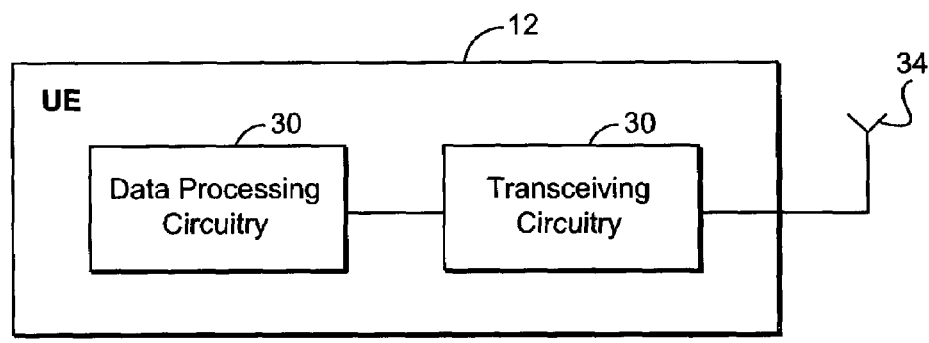
FIGS. 7A and 7B illustrate simplified function block diagrams of a user equipment in a radio network controller.
Figure 7B:
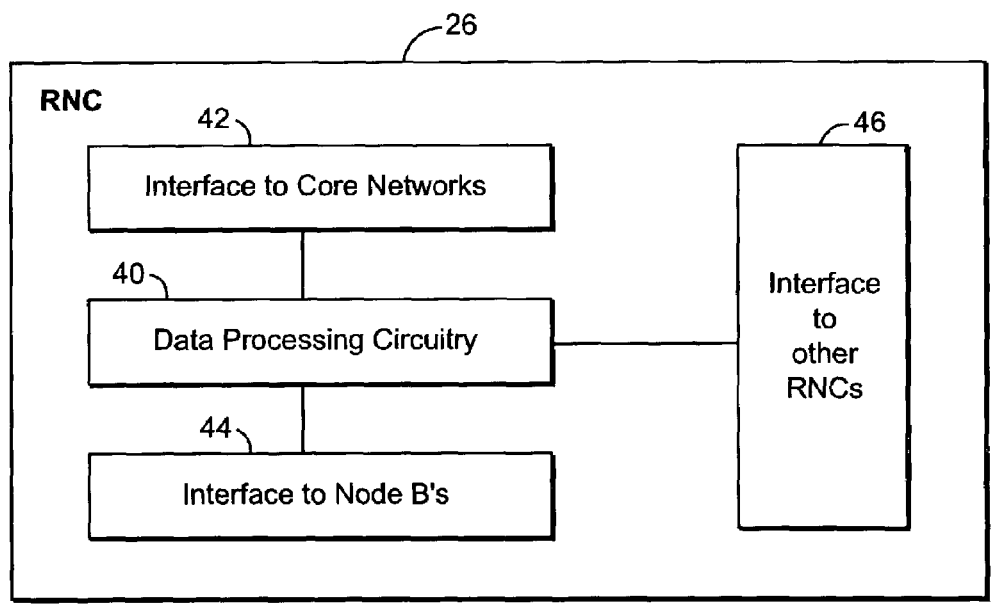

A more detailed, but still example of the present invention is now described in the context of a UMTS system in which the radio access network corresponds to a UTRAN as illustrated in FIGS. 2 and 3. In the simplified block diagram of FIG. 7A, the user equipment 12 includes data processing circuitry 30 coupled to radio transceiving circuitry 32, which in turn is coupled to an antenna 34. The data processing circuitry 30 performs functions to implement the security configuration and reconfiguration various operations associated with the present invention. FIG. 7B illustrates a simplified radio network controller 26 from the UTRAN. The RNC 26 includes data processing circuitry 40 coupled to various interfaces including an interface 42 to the core networks, an interface 44 to the node Bs, and an interface 46 to other RNCs in the UTRAN. The data processing circuitry 40 performs functions to implement various security configuration and reconfiguration operations associated with the present invention.

Figure 8:
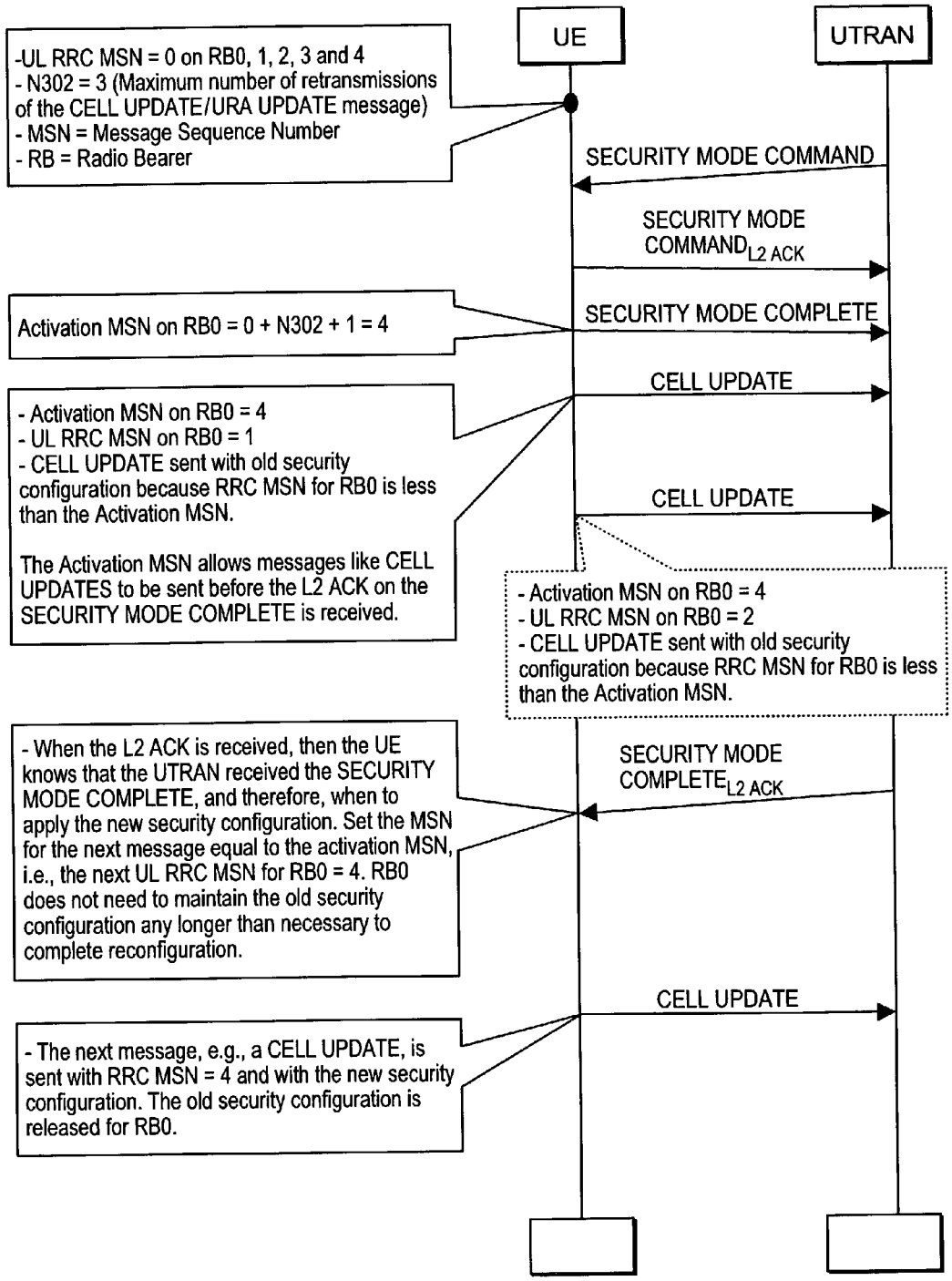
FIG. 8 illustrates a signaling diagram for implementing a security reconfiguration in accordance with one detailed, example, and non-limiting embodiment of the present invention.

Attention is directed to the example signaling diagram shown in FIG. 8 for reconfiguring a security configuration for a connection established between the UE and the UTRAN. It is assumed in the diagram that a connection involving the UE is set up and that an initial security configuration is in place for the connection. In the first function block shown for the UE, the UE sets the uplink radio resource control message sequence number to zero for various radio bearers including RB0, 1, 2, 3, and 4. The UE and the UTRAN count the number of messages sent from this initialized value for each radio bearer using a MSN count-I value for each bearer. The initial MSN value is zero. The UE also sets a constant, labeled here as N302, equal to some value shown as 3. In this example, that constant is equal to a number of allowed retransmissions of the cell update/UTRAN routing area (URA) update message.

When a security reconfiguration operation is necessary, the UTRAN sends a Security Mode Command to the UE, which is acknowledged by the UE in a layer 2 Security Mode Command acknowledgement. After that acknowledgment, the UE sets an activation message sequence number for each uplink bearer with the example shown in the figure for RB0=0+N302+1=4. The UE sends a Security Mode Complete message to the UTRAN. While waiting for the UTRAN to acknowledge the Security Mode Complete message which signals that the reconfiguration process is completed, the UE sends the UTRAN a cell update message using the initial security configuration. After sending the cell update message, the uplink MSN count for RB0 is incremented to 1. Another cell update message is sent by the UE before the UTRAN acknowledges the Security Mode Complete message using the initial security configuration.

When the UE receives the acknowledgement of the Security Mode Complete message from the UTRAN, the UE knows that the UTRAN received the Security Mode Complete message indicating that the security reconfiguration is complete. At this point the UE and UTRAN are free to use the new security configuration. The UE therefore sets the MSN count, which is currently at 2, to the activate message sequence number, which is 4. It sends the next message, a cell update message, using the new security configuration. Because that message includes the RRC MSN count set at the activation MSN, the UTRAN also knows to use the new security configuration.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention.

What is claimed is:

1. A method for protecting the security of a communication between a mobile radio and a radio access network (RAN), comprising:
　　establishing a connection through the RAN to support a communication with the mobile radio;
　　configuring the connection with a first security configuration;
　　sending one or more messages over the connection using the first security connection, each message having a message sequence number;
　　determining a need to reconfigure the connection to a second security configuration;
　　setting an activation message sequence number associated with the reconfiguration; and
　　when the second security configuration is to be activated, sending a next message with the activation message sequence number,
　　wherein the sending step is performed to apply the second security configuration even when the activation message sequence number of messages has not been transmitted at the time that the security reconfiguration is completed.

2. The method in claim 1, wherein when the second security configuration is activated, subsequent messages are sent using the second security configuration.

3. The method in claim 1, wherein the next message is sent using the second security configuration.

4. The method in claim 1, wherein during the reconfiguration, the mobile radio transmits a message with a message sequence number lower than the activation message sequence number to the RAN using the first security configuration.

5. The method in claim 4, wherein the message transmitted by the mobile radio is a cell update message or an area update message.

6. The method in claim 1, wherein the first security configuration corresponds to a first connection associated with a session involving the mobile radio and the second security configuration corresponds to a second connection associated with the session.

7. The method in claim 6, wherein the session is a multimedia session, and the first connection relates to one type of media and the second connection relates to another type of media.

8. The method in claim 1, wherein the security configuration relates to integrity protection of the message.

9. The method in claim 8, wherein the message includes a control message related to the connection.

10. The method in claim 9, wherein the first security configuration includes a first integrity protection key used to authenticate the control signal, and the second security configuration includes a second integrity protection key used to authenticate the control signal.

11. The method in claim 1, wherein the security configuration relates to confidentiality protection of the communication, and the communication includes data traffic related to the connection.

12. The method in claim 11, wherein the first security configuration includes a first encryption key used to encrypt the data traffic, and the second security configuration includes a second encryption key used to encrypt the data traffic.

13. The method in claim 1, further comprising:
setting the activation message sequence number using a maximum number of retransmissions of a message.

14. The method in claim 13, wherein the message is a cell update message or an area update message transmitted by the mobile radio to the RAN.

15. The method in claim 1, wherein the activation message sequence number corresponds to a future message sequence number greater than a next message sequence number.

16. A mobile radio configured to communicate with an entity via a connection established through a radio access network (RAN), comprising:
radio transceiving circuitry, and
data processing circuitry configured to perform the following tasks:
establish a first security configuration for the connection;
send one or more messages over the connection using the first security connection, each message having a message sequence number;
determine if the connection is to be reconfigured to a second security configuration;
determine an activation message sequence number associated with the reconfiguration; and
when the second security configuration is to be activated, send a next message with the activation message sequence number,
wherein the data processing circuitry is configured to apply the second security configuration even when the activation number of messages has not been transmitted when the security reconfiguration is completed.

17. The mobile radio in claim 16, wherein when the second security configuration is activated, subsequent messages sent and received by the mobile radio use the second security configuration.

18. The mobile radio in claim 17, wherein the data processing circuitry is configured to transmit the next message using the second security configuration.

19. The mobile radio in claim 16, wherein during the reconfiguration, the data processing circuitry is configured to transmit a message with a message sequence number lower than the activation message sequence number to the RAN using the first security configuration.

20. The mobile radio in claim 19, wherein the message transmitted by the mobile radio is a cell update message or an area update message.

21. The mobile radio in claim 16, wherein the first security configuration corresponds to a first connection associated with a session involving the mobile radio and the second security configuration corresponds to a second connection associated with the session.

22. The mobile radio in claim 21, wherein the session is a multimedia session, and the first connection relates to one type of media and the second connection relates to another type of media.

23. The mobile radio in claim 16, wherein the security configuration relates to integrity protection of the message, and the message includes a control message related to the connection.

24. The mobile radio in claim 23, wherein the first security configuration includes a first integrity protection key used to authenticate the control signal, and the second security configuration includes a second integrity protection key used to authenticate the control signal.

25. The mobile radio in claim 16, wherein the security configuration relates to confidentiality protection of the communication, and the communication includes data traffic related to the connection.

26. The mobile radio in claim 25, wherein the first security configuration includes a first encryption key used to encrypt the data traffic, and the second security configuration includes a second encryption key used to encrypt the data traffic.

27. The mobile radio in claim 16, wherein the data processing circuitry is configured to set the activation message sequence number using a maximum number of retransmissions of a message.

28. The mobile radio in claim 27, wherein the message is a cell update message or an area update message transmitted by the mobile radio to the RAN.

29. The mobile radio in claim 16, wherein the activation message sequence number corresponds to a future message sequence number greater than a next message sequence number.

30. A radio access network (RAN) node for establishing a mobile radio connection through the RAN to support communications involving the mobile radio, comprising:
data processing circuitry configured to perform the following functions:
establish a first security configuration parameters for the connection;
send or receive one or more messages over the connection using the first security connection, each message having a message sequence number;
determine if the connection is to be reconfigured to a second security configuration;
send a security configuration change message to the mobile radio that indicates to the mobile radio to apply the second security configuration even when the activation number of messages has not been transmitted when the security reconfiguration is completed;
detect a next message from the mobile radio with the activation message sequence number; and
upon detecting the next message, activate the second security configuration for the connection.

31. The RAN node in claim 30, wherein when the second security configuration is activated, subsequent messages are sent using the second security configuration.

32. The RAN node in claim 31, wherein the next message is sent using the second security configuration.

33. The RAN node in claim 30, wherein the data processing circuitry is configured to transmit a security mode command to the mobile radio when the connection is to be reconfigured to the second security configuration.

34. The RAN node in claim 33, wherein the data processing circuitry is configured to detect a security mode complete message from the mobile radio, in response to the security mode command, that includes the activation message sequence number.

35. The RAN node in claim 34, wherein the data processing circuitry is configured to transmit a security mode complete acknowledge message to the mobile radio to signal to the mobile radio that the security reconfiguration is complete.

36. The RAN node in claim 30, wherein the data processing circuitry is configured to detect during the reconfiguration, a message from the mobile radio having a message sequence number lower than the activation message sequence number to the RAN using the first security configuration.

37. The RAN node in claim 36, wherein the message transmitted by the mobile radio is a cell update message or an area update message.

38. The RAN node in claim 30, wherein the security configuration relates to integrity protection of the message, and the message includes a control message related to the connection.

39. The RAN node in claim 38, wherein the first security configuration includes a first integrity protection key used to authenticate the control signal, and the second security configuration includes a second integrity protection key used to authenticate the control signal.

40. The RAN node in claim 30, wherein the security configuration relates to confidentiality protection of the communication, and the communication includes data traffic related to the connection.

41. The RAN node in claim 40, wherein the first security configuration includes a first encryption key used to encrypt the data traffic, and the second security configuration includes a second encryption key used to encrypt the data traffic.

42. The RAN node in claim 30, wherein the activation message sequence number corresponds to a future message sequence number greater than a next message sequence number.

* * * * *

UNITED STATES PATENT AND TRADEMARK OFFICE
CERTIFICATE OF CORRECTION

| | | |
|---|---|---|
| PATENT NO. | : 7,020,455 B2 | Page 1 of 1 |
| APPLICATION NO. | : 10/259435 | |
| DATED | : March 28, 2006 | |
| INVENTOR(S) | : Krishnarajah et al. | |

It is certified that error appears in the above-identified patent and that said Letters Patent is hereby corrected as shown below:

In column 8, line 22, delete "connection" and insert --configuration--.

In column 9, line 29, delete "connection" and insert --configuration--.

In column 10, line 38, delete "connection" and insert --configuration--.

Signed and Sealed this

Twenty-first Day of February, 2012

David J. Kappos
*Director of the United States Patent and Trademark Office*